June 13, 1967 R. G. BOARD ET AL 3,324,519
RETRACTABLE SAFETY BELTS
Original Filed April 17, 1963
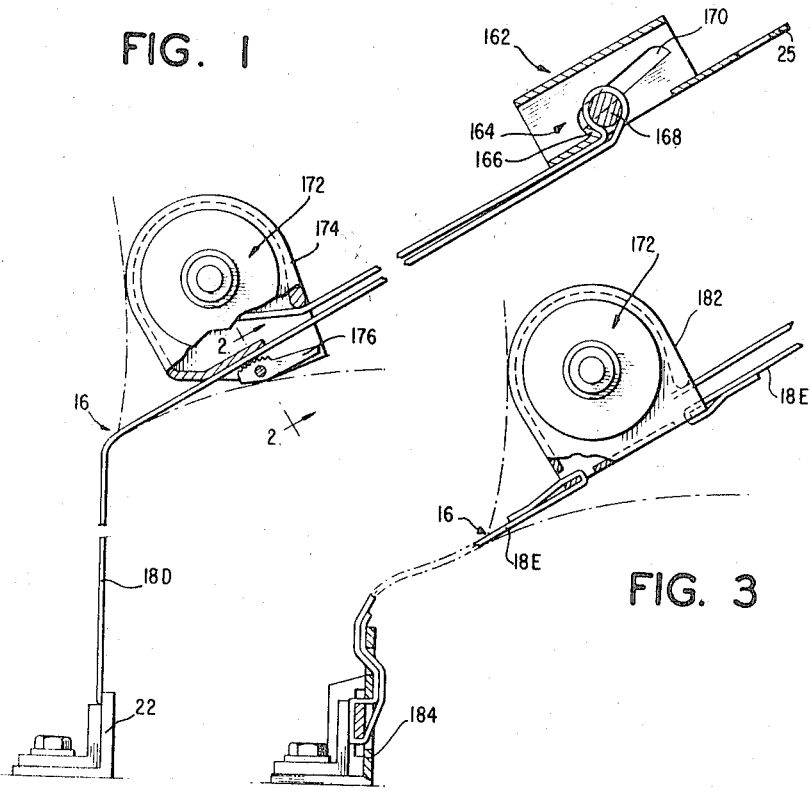
FIG. 1
FIG. 3
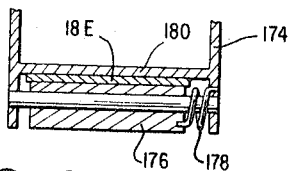
FIG. 2
INVENTORS
RICHARD G. BOARD
BY   NELSON H. SHAPIRO
*Shapiro and Shapiro*
ATTORNEYS United States Patent Office 3,324,519
Patented June 13, 1967

3,324,519
RETRACTABLE SAFETY BELTS
Richard G. Board, Bethesda, Md. (3000 Connecticut Ave., Washington, D.C. 20008), and Nelson H. Shapiro, Rockville, Md. (640 Washington Bldg., Washington, D. C. 20005)
Original application Apr. 17, 1963, Ser. No. 273,696, now Patent No. 3,249,386, dated May 3, 1966. Divided and this application May 2, 1966, Ser. No. 546,699
4 Claims. (Cl. 24—191)

This application is a division of Ser. No. 273,969, filed Apr. 17, 1963, for "Retractable Safety Belts," now Patent No. 3,249,386, granted May 3, 1966.

This invention relates to retractable safety belts, and more particularly to retractable seat belts for automotive vehicles.

It has heretofore been proposed to employ double-flight perforated belts which are retracted by a floor-mounted reel and which are drivingly engaged with studded rollers or cobs in the belt fastener parts, so that the movement of the flights of the perforated belts through the fastener parts may be arrested by locking protrusions which prevent rotation of the cobs. This proposal has the disadvantages of requiring special belts, the perforations of which are subject to wear in use, and of requiring double length belts and large reels for retracting the double belt length. The proposal also suffers from the need for special guides to ensure proper movements of the belt, the need for pivotal floor brackets to accommodate seat movement, the need for highly specialized fastener hardware, and the need for passing the belts upwardly around the sides of the seat because of the impracticality of passing long, moving, double flights of belt through the seat.

Accordingly, it is a principal object of the present invention to provide improved seat belts and the like which are retractable when not in use and which obviate all or most of the disadvantages set forth above. A further object of the invention is to provide retractable seat belts which may be installed so as to pass between the back and lower portions of the seat, but without movement of the belt through the seat during retraction or extension of the belt.

Still another object of the invention is to provide improved retractable seat belts of the foregoing type which may utilize conventional imperforate belt material in conjunction with belt hardware which need not be drastically different from existing hardware.

Yet another object of the invention is to provide retractable seat belts of the foregoing type which may be utilized in existing automotive vehicles without modification of the vehicle and which may employ existing or conventional mounting brackets, and even existing installed belt material.

An additional object of the invention is to provide retractable seat belts of the foregoing type constructed so that collision forces are not applied to the retracting reel or the retracting reel housing.

A still further object of the invention is to provide retractable seat belts of the foregoing type in which the position of the reel is adjustable and selectable.

Another object of the invention is to provide retractable seat belts in which the engagement of mating fastener parts automatically ensures the locking of one or more of the parts to the belt.

Another object of the invention is to provide retractable seat belts of the foregoing type in which the locking action permits further retraction but not extension of the belt.

Still another object of the invention is to provide improved retractable seat belts and the like employing a reel which rests upon the belt itself.

Briefly stated, and without limiting the scope of the invention, the present invention comprises a seat belt which may include a pair of straps having one end fixed to the floor of a vehicle and having conventional fastener elements for joining the straps to form a belt across the body of the user. Either or both straps may be made retractable. To provide for retraction of a strap, a spring wound retraction reel is utilized, which, in use, rests upon a flight of strap extending from the strap anchorage to the strap fastener element. The strap fastener element has a casing provided with a sliding pin clamp, which, when actuated, fixes the position of the fastener element upon the strap. The strap passes from its anchorage, beneath the reel, into the bottom of the casing, reversely through the clamp, out of the bottom of the casing, to the reel. The casing is turnable relative to both flights of strap beneath it and relative to the reel, so that the orientation of the force exerted by the strap upon the pin may be readily changed to release the clamp. When the belt is placed in the user-restraining position, the forces exerted upon the sliding pin are oriented to close the clamp automatically if an extensile pull is exerted upon the belt. When the belt is unfastened, the reel retracts the strap, moving the fastener casing to a rest position.

The foregoing and other objects, advantages, and features of the invention, and the manner in which the same are accomplished will become more readily apparent upon consideration of the following detailed desscription of the invention taken in conjunction with the accompanying drawings, which illustrate preferred and exemplary embodiments, and wherein:

FIGURE 1 is a partly sectional side elevational view illustrating an anchorage, strap, fastener part with clamp, and reel;

FIGURE 2 is a sectional view along line 2—2 of FIGURE 1; and

FIGURE 3 is a partly sectional side elevational view of a modified form of the invention.

Referring to the drawings, and initially to FIGURE 1 thereof, a retractable seat belt of the invention comprises at least one strap 18D, one end of which may be fixed to the floor of a vehicle by means of a suitable anchor 22. The strap may pass upwardly through the opening at the crotch 16 of a seat to a fastener part 162. The fastener part has a strap clamp 164 comprising a fixed abutment 166 and a movable abutment 168, which is a pin having reduced ends slidable in sloping slots 170 in the side walls of the fastener part casing. While the fastener part is shown having a conventional fastener element tongue 25 at the front of the casing, which may mate with a conventional buckle fixed to one end of another floor-anchored strap, it is apparent that the principles of the invention may be applied where the fastener part 162 is a buckle or other type of fastener part.

The strap passes through an opening in the bottom wall of the fastener part casing, around abutment 168 and between this abutment and fixed abutment 166. Either or both of the abutments may be roughened, although it is preferred that strap movement around abutment 168 be relatively smooth. The strap then turns back upon itself to form overlapped layers or flights and extends rearwardly to a spring-biased reel 172, which may be rotatably supported in a housing 174. In use the reel is located above the lower portion of the seat, rests upon the underlayer (or flight) of strap, where it may tilt from side-to-side, and is adjustable along the underlayer. A cam lever 176 may be pivotally mounted upon the reel housing and provided with a torsion spring 178 (FIGURE 2) which tends to move the lever in a direction to clamp the underlayer of the strap between the lever and an abutment surface 180 of the reel housing for securing the reel housing to the underlayer.

The biasing spring of the reel tends to wind up the strap and to draw the fastener part to a rest position adjacent to the crotch of the seat. The strap may be extended from the reel by pulling the fastener part 162 away from its rest position, tilting the fastener part casing relative to the underlying flights of strap and relative to the reel to release the clamp. When the fastener element 25 is engaged with the mating fastener element of the other strap (not shown), extinsile pull down upon the fastener element and the casing will be in such direction as to cause clamping of the strap 18D and to prevent further extension of the strap.

In the modified form of FIGURE 3 the underlayer of strap 18E is divided into two parts which are fixed to the reel housing 182 containing the reel 172. In this form the reel housing is subjected to collision forces, unlike the embodiment of FIGURE 1. The portion of the strap extending between the floor anchor 184 and the reel housing may be adjustable, if desired.

While preferred embodiments of the invention have been shown and described, it will be apparent to those skilled in the art that changes can be made in these embodiments, without departing from the principles and spirit of the invention, the scope of which is defined in the appended claims. Accordingly, the foregoing embodiments are to be considered illustrative rather than restrictive of the invention, and those modifications which come within the meaning and range of equivalents of the claims are to be included therein.

The invention claimed is:

1. A retractable seat belt comprising a first fastener part free to move across the body of a user in order releasably to engage a mating second fastener part to place the belt in user-restraining position, said first fastener part having a casing with a front end adapted to engage the second fastener part, a rear end, and sides extending longitudinally between said ends, a spring-wound retraction reel located rearwardly of said casing for rotation about an axis transverse to the sides of said casing, and a strap having a first portion adapted to be anchored and a second portion secured to said reel for extension and retraction, said casing having means for preventing extension of said strap and including a pair of abutments supported upon said casing transversely of the sides, one of said abutments being a pin supported forwardly of the other abutment for translational movement with respect to said casing toward and away from the other abutment, said casing having a bottom opening and said strap passing as a first layer from said first portion through said opening, over said pin reversely from the front thereof, between said pin and the other abutment, under the other abutment, again through said bottom opening, and then as a second layer rearwardly upon itself to said reel for exerting a force on said pin to move it toward the other abutment and to clamp said strap to said casing when the strap below said casing has a rearward orientation along said casing, said casing being free to turn relative to both said layers about a transverse axis substantially at said pin in order to modify the force upon said pin and to facilitate movement of said strap about said pin during desired extension and retraction of said strap, said reel having means for supporting it upon the first layer of strap and being free to tilt with changes in orientation of said strap.

2. The retractable seat belt of claim 1, said sides of said casing having parallel longitudinal slots receiving the ends of said pin with freedom to move along the slots.

3. The retractable seat belt of claim 1, further comprising means for adjustably fixing the position of said reel along said first layer of strap.

4. The retractable seat belt of claim 1, said reel supporting means comprising a housing to which the first layer is connected.

References Cited

UNITED STATES PATENTS 3,020,089  2/1962  Monroe _____ 297—388
3,078,538  2/1963  Brown.

WILLIAM FELDMAN, *Primary Examiner.*

E. SIMONSEN, *Assistant Examiner.*